(12) United States Patent  
Mitchell et al.

(10) Patent No.: US 6,175,343 B1  
(45) Date of Patent: Jan. 16, 2001

(54) METHOD AND APPARATUS FOR OPERATING THE OVERLAY OF COMPUTER-GENERATED EFFECTS ONTO A LIVE IMAGE

(75) Inventors: Brian K. Mitchell; Robert V. Wells, both of Huntsville, AL (US)

(73) Assignee: AniVision, Inc., Huntsville, AL (US)

( * ) Notice: Under 35 U.S.C. 154(b), the term of this patent shall be extended for 0 days.

(21) Appl. No.: 09/028,565

(22) Filed: Feb. 24, 1998

Related U.S. Application Data

(60) Provisional application No. 60/039,040, filed on Feb. 24, 1997.

(51) Int. Cl.[7] .................................................. G09G 5/00  
(52) U.S. Cl. ................................. 345/8; 345/7; 358/207; 358/335  
(58) Field of Search ....................... 348/39, 115; 358/209, 358/87, 335, 629; 345/7, 8

(56) References Cited

U.S. PATENT DOCUMENTS

| | | | |
|---|---|---|---|
| 3,943,648 | 3/1976 | Sterne | 40/106.51 |
| 4,055,011 | 10/1977 | Longenecker | 40/124.1 |
| 4,985,762 * | 1/1991 | Smith | 358/87 |
| 5,130,794 * | 7/1992 | Ritchey | 358/87 |
| 5,153,716 * | 10/1992 | Smith | 358/87 |
| 5,241,391 * | 8/1993 | Dodds | 358/209 |
| 5,287,437 * | 2/1994 | Deering | 395/127 |
| 5,441,414 | 8/1995 | Chretien | 434/307 R |
| 5,495,576 * | 2/1996 | Ritchey | 395/125 |
| 5,684,498 * | 11/1997 | Welch et al. | 345/8 |

* cited by examiner

*Primary Examiner*—William A. Cuchlinski, Jr.  
*Assistant Examiner*—Marthe Marc-Coleman  
(74) *Attorney, Agent, or Firm*—Sirote & Permutt, P.C.; Russell Carter Gache

(57) ABSTRACT

A method and apparatus for observing exhibit sites which provides the ability to overlay computer generated images and sound on a live exhibit to create and present these overlays on demand in varying levels of detail for use by the general public, in indoor and outdoor settings, without requiring instruction, operators, fitting, training, or supervision. The viewing device may comprise a viewing portion, a processing portion, a displaying portion, and an audio portion. Each of these components combine to provide the user with the ability to view an actual exhibit site overlaid with informational or historic re-creations to enhance the exhibit experience, as opposed to a separate display booth or other means which takes the exhibit viewer's attention away from the actual exhibit site.

47 Claims, 13 Drawing Sheets

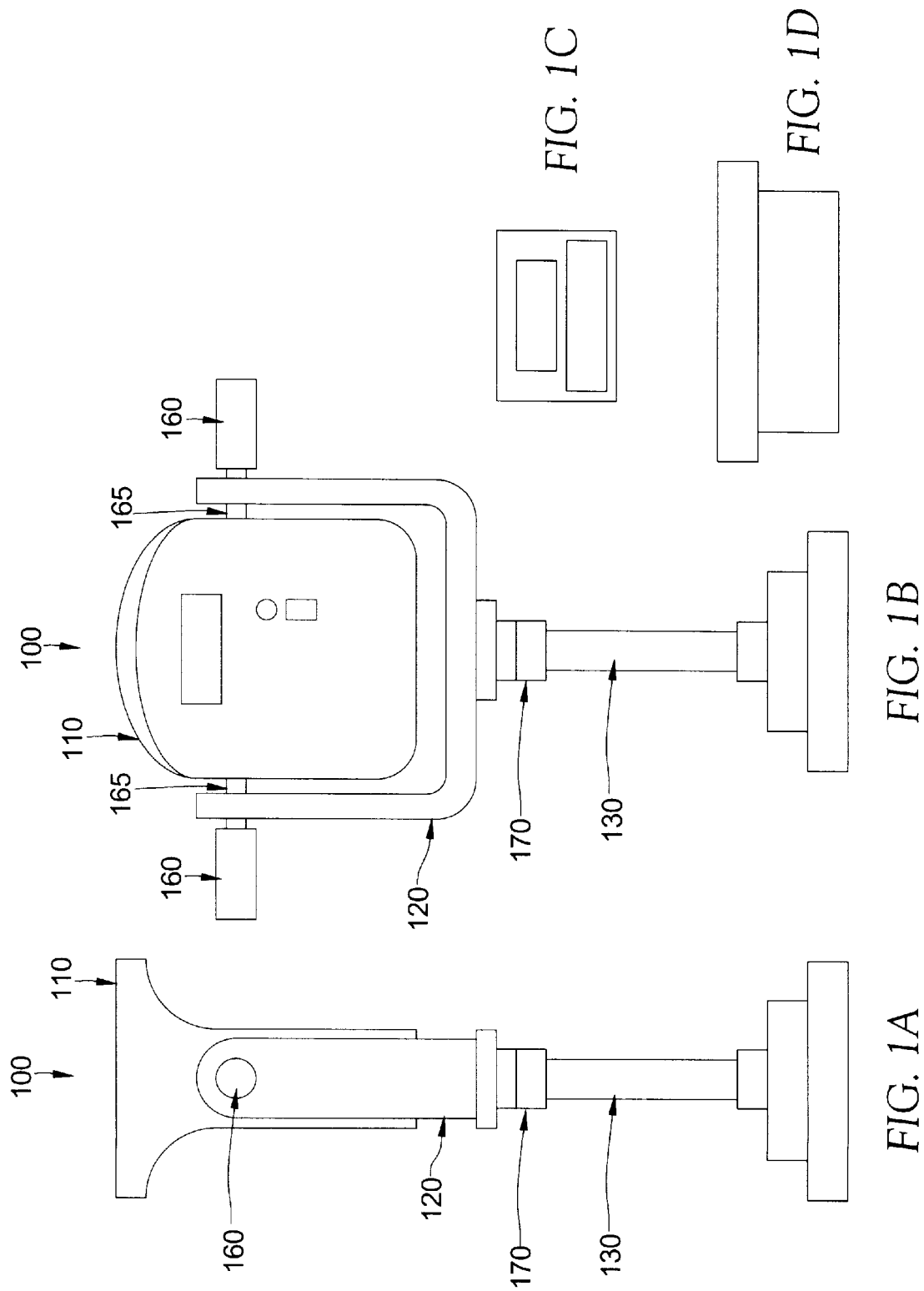

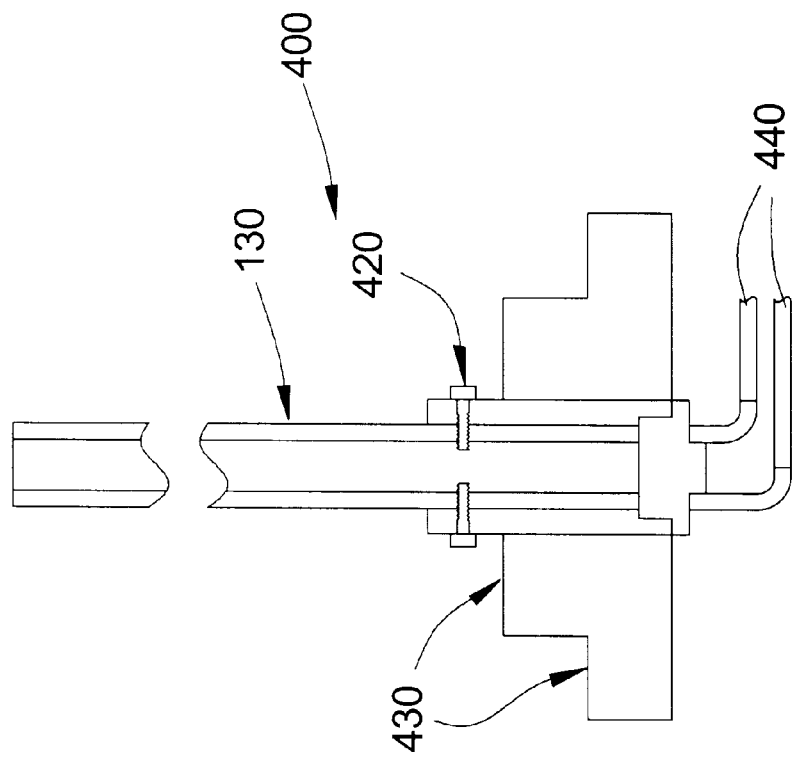
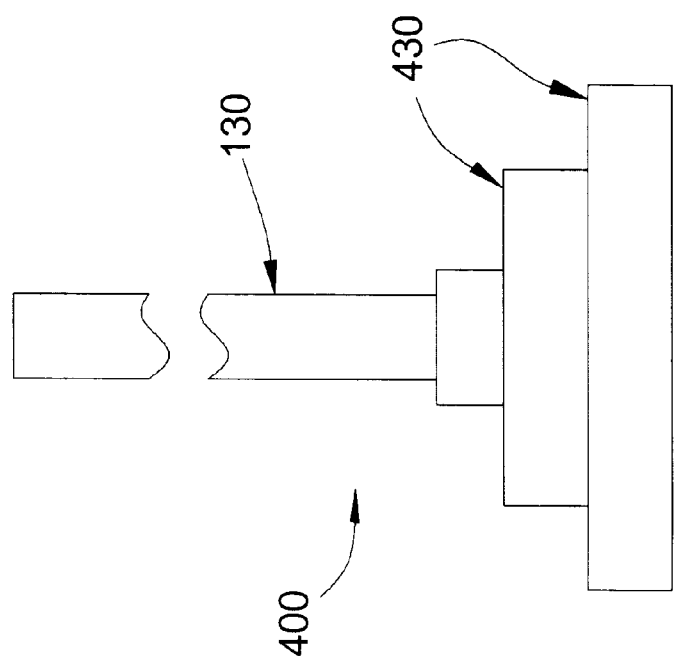
FIG. 4B
FIG. 4A

Mirror-Based Viewer

Display-Based Viewer

METHOD AND APPARATUS FOR OPERATING THE OVERLAY OF COMPUTER-GENERATED EFFECTS ONTO A LIVE IMAGE

CROSS REFERENCE TO RELATED APPLICATION

This application claims the benefit of U.S. Provisional Application No. 60/039,040, filed Feb. 24, 1997.

1. Technical Field

This invention relates to an interactive viewing aid. More particularly, this invention relates to a device that provides a method and apparatus for navigating a viewer in multiple degrees of freedom while it presents a live exhibit integrated with position-correlated, computer-generated sound and visual effects. Additionally, this method and apparatus enables on-demand presentation of overlays that can be operated and controlled by the unskilled public.

2. Background of the Invention

Many historical, natural, and physical exhibit sites, such as exhibit sites found in state parks, rely on kiosks, simple poster art, or human narration to convey the historical events that occurred at the exhibit site. Although cost-effective, these exhibit aids fail to provide visitors with realistic re-enactments of historical events that are staged on the actual exhibit site. In fact, only "human-intensive" re-enactments, such as those performed at Civil War battle sites using actors, provide visitors with an effective "site-staged" presentation of historical events. However, these human-intensive re-enactments are expensive, difficult to schedule, and often result in damage to the exhibit site. When re-enactments are scheduled, visitors often flock to the exhibits sites creating congestion problems within the exhibit site. For these reasons, human re-enactments are rarely scheduled at exhibit sites.

Moreover, the human-intensive re-enactment methods cannot be used to recreate natural phenomena such as the eruption of Mount St. Helen's, mythical encounters such as sightings of the Loch Ness Monster, or human achievements such as the construction of Mount Rushmore. For those types of exhibits, exhibitors typically rely on films, photographs, or animation to re-create the historical events. However, instead of focusing the visitor's attention on the exhibit site, those exhibit aids typically direct the viewer's attention to a TV monitor. Thus, there is a need for an exhibit aid which provides re-enactments with exceptional realism, while maintaining the visitor's interest focused on the exhibit site. There is a further need for an exhibit aid that does not require a "human-intensive" re-enactment.

Exhibit aids for viewing exhibit sites, other than those described above, are also available. One exhibit aid sometimes used is a coin-operated magnification device. For example, the magnification device may be installed on a scenic overlook or a tall building to allow users a magnified view of the natural settings. Although these magnification devices do provide a magnified view of the present-day exhibit site to the user, they do not re-create or re-enact historical events at the actual exhibit site. Thus, there is a need for an exhibit aid that provides a view of the exhibit site and presents an historical re-enactment in conjunction with the magnified view.

Virtual reality head-mounted displays or boom-mounted virtual reality devices are sometimes used as exhibit aids. However, these virtual reality devices do not interact with the present-day exhibit site to provide the user with an historical re-enactment. Moreover, these virtual reality devices are typically not rugged enough for long-term use in seasonal outdoor environments. Thus, there is a need for a rugged viewing device that creates virtual reality re-enactments in conjunction with an actual exhibit site.

There are known processes for generating computer images for real-time overlay on natural sites through user driven free navigation. For example, there are several ongoing military applications that provide this capability for infantry training applications. However, all known products of this type use expensive liquid crystal display (LCD) technology for overlaying the imagery. Furthermore, none of those existing devices enable the use of low cost technologies that can also be interchanged with higher end components for virtual reality overlays. Moreover, none of these processes have integrated the overlay-process with synchronized audio and video effects processing. Existing technology is not integrated into an exhibit aid structure to allow the public to interact with it, nor does it facilitate a structured procedure to allow visitor interaction Existing devices also do not support physically removable content. Thus, there is a need for an inexpensive exhibit aid that overlays computer-generated images onto a viewed image to provide a suitable device and procedure for user interactions, field replaceable content, and applications of synchronized audio and video effects processing.

SUMMARY OF THE INVENTION

The present invention satisfies the above described needs by providing an apparatus and method for allowing the public to operate an exhibit aid device that overlays computer-generated visual and audio effects onto a live image. Embodiments of the invention allow virtual reality re-enactments and augmented reality re-enactments that can be presented on-demand to users.

Aspects of the invention enable users to interact with an exhibit site better than prior art exhibit aids. Aspects of the invention allow users to view the actual exhibit site through a viewing device and create on-demand re-enactments at points of interest in the exhibit site. While viewing the exhibit site, it may be determined which location the person is viewing and visual and audio information may be presented to the user including simulation of effects, historical film footage overlays, and tutorial type animation of important facts. These capabilities have never before been available for operation and presentation to users while a user is examining the actual exhibit site. Only the present invention provides a device suitable for public use (indoors and outdoors) and a procedure that can allow users to interactively operate and request overlay effects that can embellish what is seen by the naked eye and heard by the unaided ear to make the exhibit site appear as it did or will in another time.

In one aspect, the invention operates by providing a viewing device including a viewing portion known as an image head. The user inserts a token if the invention is configured to require such. After inserting a token, the user may step up to the viewing portion, aim it at any point of interest in the exhibit site, and push a start button. When the user pushes the start button, a timer displays the viewing time remaining. The viewing device initializes by determining its position relative to its initial orientation and determines the animated content that needs to be displayed to the user. The viewing device then provides a natural "through-the-lens" view of the exhibit site. An audio narration sequence may begin to tell the viewer about the exhibit site.

Information is provided to guide the user to the proper viewing point on the exhibit site. As the proper viewing point becomes visible or centered in the viewing screen, the viewing device recognizes the user's request for additional information. The viewing device may then display computer-generated effects over the "through-the-lens" view of the exhibit location.

In another aspect, the invention is an exhibit viewing device including an image head for housing an integrated electronics system. The integrated electronics system is re-configurable for the dynamic and correlated generation and overlay of visual and audio effects onto a natural light source exhibit viewed through the exhibit viewing device. The exhibit viewing device also includes a head mount for user-controlled navigation of the image head. The exhibit viewing device may also include a stand connected to the head mount for stability of the exhibit viewing device and user access to the exhibit viewing device. The integrated electronic system may be operative to generate audio signals and the image head may include a speaker system for broadcasting the audio signals.

In still another aspect, the exhibit viewing device may include a position tracking system for determining the viewing elevation and viewing azimuth of the exhibit viewing device so that the visual effects may be coordinated, generated and overlaid onto the proper natural light source exhibit viewed through the exhibit viewing device. Among other devices, the position tracking system may comprise an electromagnetic measurement device or digital shaft encoders.

In still other aspects, the integrated electronics system of the viewing device may include an optical unit for overlaying the visual effects onto the natural light source exhibit. In still another aspect, the invention is a method for overlaying a computer-generated image onto a viewed image of an exhibit site in an electronic system for viewing the exhibit site incorporated into a viewing device. A position of the viewing device is determined. A user of the viewing device is guided to move, or freely guides, the viewing device to a particular location of the exhibit site. Computer animation and sound are generated regarding the particular location of the exhibit site. The computer effects are overlaid onto a lens view of the viewing device. The method may also include determining whether a token has been inserted into the viewing device before determining the position of the viewing device.

In still other aspects, the method may include providing audio effects and the lens view to the user before guiding the user to move the viewing device. The step of guiding the user of the viewing device to move the viewing device to a particular location of the exhibit site may comprise displaying arrows on the lens view of the viewing device. The arrows may correspond to the direction which the user should move the viewing device to reach the particular location.

In another aspect, the invention provides a unique device that is suitable for public use in parks, museums, restaurants, schools, science centers, and other high-traffic, low-supervision areas. The device utilizes a rugged design to encase electronic parts in a base enclosure and image head to ensure their protection. The device provides a durable method for navigating in two dimensions and allowing the collection of orientation data for computer processing; a durable housing for a pointable viewer having speakers, computer displays, electronic speakers and switches, position measurement devices, image capture equipment, computer processing, image integration and control storage.

In another aspect, the invention provides a unique device that allows the user to interactively browse and select information interpretations from live views of exhibits. The device allows users to navigate in azimuth and elevations while maintaining the accuracy of computer-generated positional overlays. The device provides a unique intuitive approach that does not require training or assistance. The device presents computer-generated information as the user browses over the exhibit and positions the center of view over an area of interest. The device also offers additional information upon request by the user. The device responds to user requests for additional information. The device presents tables indicating additional information. If the user positions the device over the indicator and activates the information, by pushing a button, the device may present expanded information overlays.

In another aspect of the system, the device offers a unique focusing aid. As the user pans to an area of interest, the device measures the orientations to determine the location of interest and automatically adjusts the magnification and other camera options, such as backlight, to clearly present the exhibit and the computer-generated imagery. This unique function of the invention allows it to present interpretations and interactive data for multiple exhibit items at varying distances from the invention.

In another aspect, the device can be networked to allow augmented reality interactive gaming, such that linked devices present users with consistent views of live exhibits with computer-generated overlays. For example, multiple devices can be positioned around an operational exhibit, such as a train depot, gold mine, dam, mill, factory, or assembly line, and allow each individual user to operate some aspect of the exhibit that, when combined with the other users, allows the group to virtually operate the exhibit. The invention utilizes a network to exchange the activation by each user among devices, so that a consistent view is provided by each device.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIGS. 1A and 1B are illustrations of a side view and a front view, respectively, of a viewing device in accordance with an embodiment of the present invention.

FIG. 1C is an illustration of a processing system which contains the electronic components that generate video overlays and audio signals for the viewing device.

FIG. 1D is an illustration of an alternate power supply of the viewing device.

FIGS. 4A and 4B are illustrations of a side view and a side cross-sectional view, respectively, of a platform base.

DETAILED DESCRIPTION

Figures 2A, 2B:
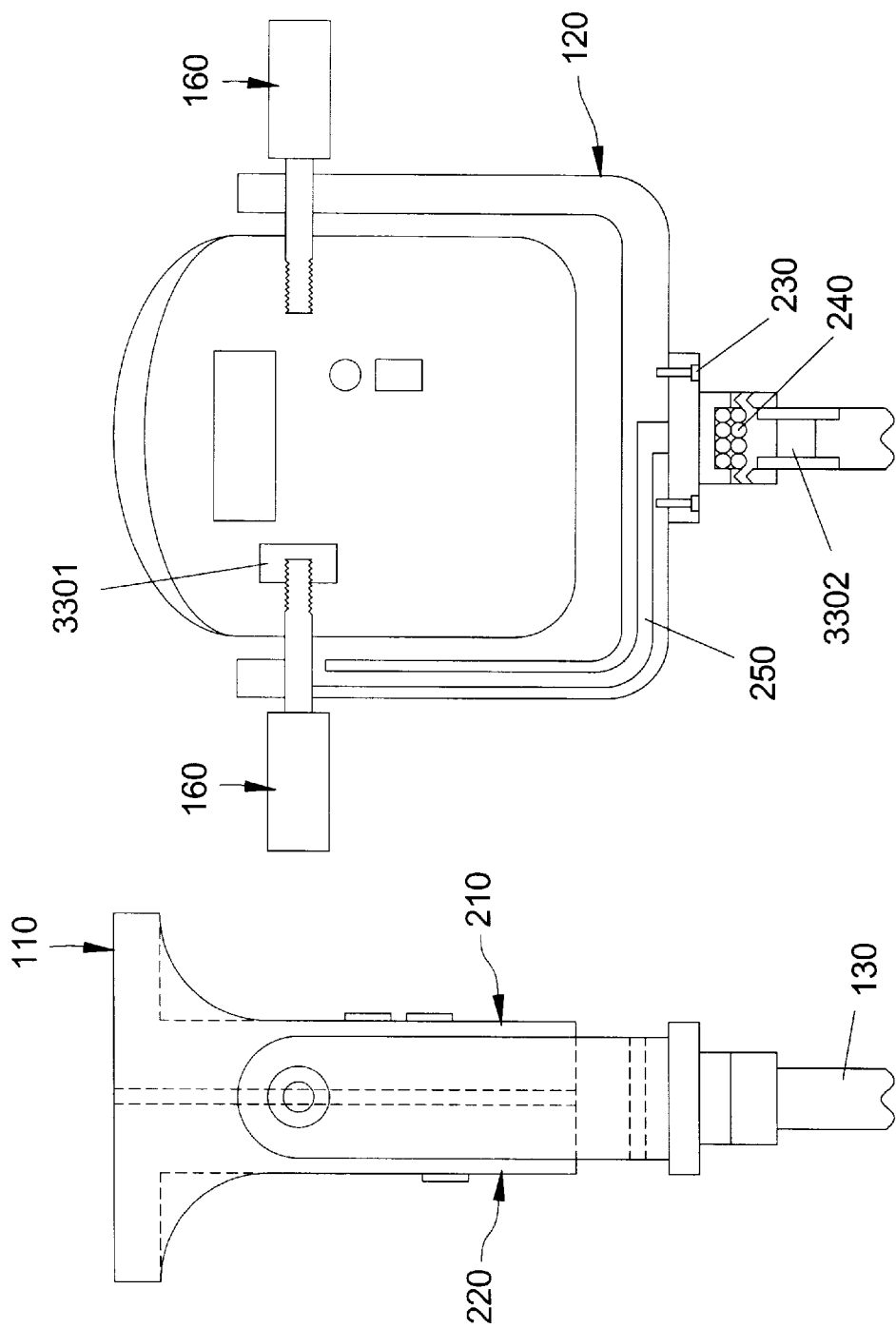
FIGS. 2A and 2B are illustrations of a side view and a front view, respectively, of an image head, a head mount, and a stand of the viewing device.

The present invention is directed toward a method and apparatus for overlaying computer-generated animation onto an image viewed through a magnifying viewing device. Embodiments of the invention allow virtual reality re-enactments and augmented reality re-enactments that can be presented on-demand to users through a magnifying viewing device.

The invention enables users to interact with the exhibit site better than prior art exhibit aids. The invention allows users to view the actual exhibit site through a viewing device and create on-demand re-enactments at points of interest in the exhibit site. While viewing the exhibit site, the invention may determine the location the person is viewing and may present visual and audio information including simulation of effects, historical film footage overlays, and tutorial type animation of important facts. These capabilities have never before been available for presentation to users while the users are examining the actual exhibit site. Prior art exhibit sites require visitors to view poster art or TV monitors that replace the exhibit site. Only the present invention can embellish what is seen by the naked eye to make the exhibit appear as it did or will in another time.

In one embodiment, the invention operates by providing a viewing device including a viewing portion called an image head. The user inserts a token if the invention is configured to require such. After inserting a token, the user may step up to the viewing portion, aim it at any point of interest in the exhibit site, and push a start button. When the user pushes the start button, a timer displays the viewing time remaining. The viewing device initializes by determining its position relative to its initial orientation and determines the animated content. The viewing device then provides a natural "through-the-lens" view of the exhibit site. An audio narration sequence may begin to tell the viewer about the exhibit site. Information is provided to guide the user to the proper viewing point on the exhibit site. As the proper viewing point becomes visible or centered in the viewing screen, the viewing device recognizes the user's request for additional information.

The viewing device may then generate a computer animation of an historical event or other pertinent information depending on the particular exhibit site. The viewing device will then overlay the computer animation on the actual through-the-lens visual image of the exhibit site being viewed by the user. This provides the user with the illusion that he is watching an actual re-creation of some historical event at the exhibit site. While the user is viewing the re-created events, the narration continues, and may be supplemented with sound effects, such as explosions, cannon fire, or other appropriate sounds. Finally, the timer expires and the presentation terminates.

In alternative embodiments, an overlay may be generated which includes "hot-spots," or areas on the viewing screen that mark points of interest to many viewers. By navigating the viewing device to a hot-spot, the user may be provided with additional information about that particular point of interest on the exhibit.

While aspects of the present invention will be described in the general context of computer programs that run on an operating system in conjunction with a computer, those skilled in the art will recognize that, generally, computer programs include routines, components, data structures, etc. that perform particular tasks or implement particular abstract data types. Referring now to the drawings, in which like numerals represent like elements throughout the several figures, aspects of the present invention will be described.

Referring now to FIGS. 1A and 1B, a side view and a front view, respectively, of a viewing device 100 in accordance with an embodiment of the present invention will be described. The viewing device 100 consists of an image head 110, a head mount 120, and a stand 130.

The image head 110 houses a processing system 140 (illustrated in FIG. 1C) which contains the electronic components that generates video overlays and audio signals.

The head mount 120 holds the image head 110 in place. The viewing device 100 also includes handles 160 protruding from each side of the image head 110 to allow movement of the image head 110. The handles 160 are generally cylindrical in shape and include a shaft portion 165 that extends through holes in the head mount 120 to connect the image head 110 to the head mount 120. By moving the handles 160, a user may change the viewing azimuth and elevation of the image head 110, thereby changing the image viewed by a user. The head mount 120 is mounted atop stand 130 and rotates about the axis of stand 130 to change the viewing azimuth. The handles 160 rotate the image head 110 about the axis of the handles 160 to change the viewing elevation of the image head 110. An assembly 170 that connects the base of the head mount 120 to the top of the stand 130 allows the image head 110 and head mount 120 to rotate about the axis of stand 130.

The viewing device 100 may also include an auxiliary power supply 150 as illustrated in FIG. 1D.

Referring now to FIGS. 2A and 2B, a side view and a front view, respectively, of an image head 110, head mount 120, and stand 130 of viewing device 100 will be described. The image head 110 includes a face 210 and a back 220 that are preferably connected together by bolts. The viewing device 100 preferably has a modular construction which allows components to be mixed and matched to optimize the viewing device to an individual's customer price and performance requirements.

The head mount 120 is secured to the stand 130 with bolts 230. The head mount 120 is secured to the image head 110 by the handles 160. Bearings 240 allow the head mount 120 to rotate about the stand 130. The stand 130 may be constructed as a steel pole. Power may be fed to the electrical components within the image head 110 through a duct 250 in the head mount 120 and then through the handles 160.

Figure 3B:
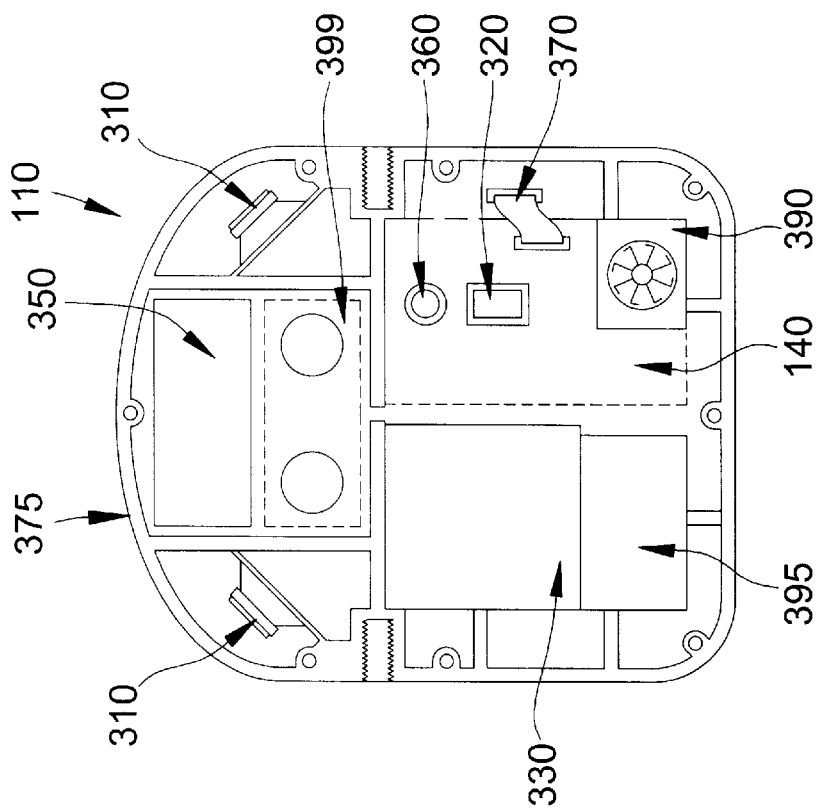
FIGS. 3A and 3B are illustrations of a side cutaway view and a front cutaway view, respectively, of an image head detailing the internal construction of the image head.
Figure 3A:
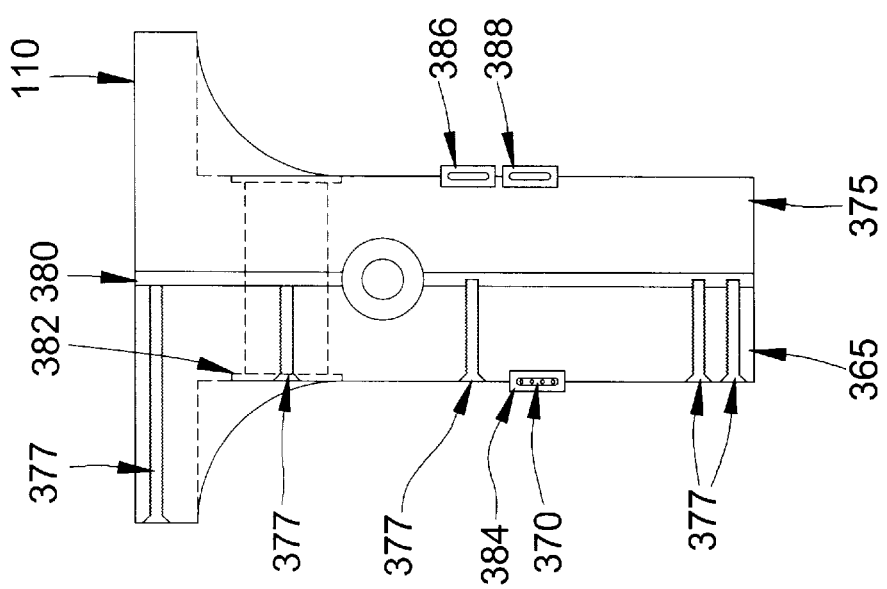

Referring now to FIGS. 3A and 3B, a side cross-sectional view and a front cross-sectional view, respectively, of image head 110 will be described. The image head 110 houses a speaker system 310 that is positioned near the point where the user's ears are when operating the viewing device 100. The positioning of the speaker system 310 allows low volume audio play that is easily heard by the user. The volume may be controlled with an optional toggle button 320.

A position tracking system 330, or 3301 and 3302, monitors the orientation data (pitch and yaw movement) of the image head 110 and feeds the orientation data to the processing system 140. The processing system 140 processes the orientation data to calculate the orientation of the viewing device 100 so that computer-generated images may be generated for overlaying. The position tracking system 330 may be an electromagnetic measurement device located in the image head 110. Alternatively, the position tracking system 3301, 3302 may comprise shaft encoders located in the two axes on which the image head 110 rotates.

The processing system 140 generates computer-generated images and transmits these images to an optical unit 350 for overlay onto the natural view. A start switch 360 powers up and initiates the viewing sequence within the processing system 140. An optional I/O interface 370 allows uploading of additional content, such as visual models, sound effects, and viewing vignettes, to the processing system 140.

Still referring to FIGS. 3A and 3B, the image head 110 may further comprise a left hand housing 365 and a right hand housing 375 connected together with bolts 377 and separated by a housing seal 380. In addition to the housing seal, the image head 110 may further comprise a viewer seal 382, an I/O interface seal 384, a start switch seal 386, and a volume control seal 388. These seals are preferably composed of rubber, but may be composed of a similar substance with sealing properties. These seals provide moisture protection for the internal components of the image head 110 so that it may properly function outside in the elements without breakdowns.

The image head 110 may also comprise a cooling fan 390 and a power converter 395. A viewer 399, preferably composed of glass, is typically situated between the speaker system 310. The viewer 399 is similar to the lenses of binoculars and allows the user to view a magnified image of an exhibit site or similar terrain.

Referring now to FIGS. 4A and 4B, a side view and a side cross-sectional view, respectively, of a platform base 400 will be described. The platform base 400 typically is a multi-tiered device at the base of the stand 130 that enables users of varying heights to view the exhibit without adjusting the height of the viewing device 100. The stand 130 may be attached to the platform base 400 with bolts 420. The platform base 400 comprises multiple tiers 430 which act as steps for users of different heights. Power conduits 440, typically composed of PVC, may extend from the bottom of the platform base 400. The power conduits 440 allow power cables to be fed up through the stand 130 to the image head 110. In alternative embodiments of the present invention, the power supply to the invention could be a DC power supply contained in a chamber below the platform base 400 or within the image head 110 itself.

Figure 5:
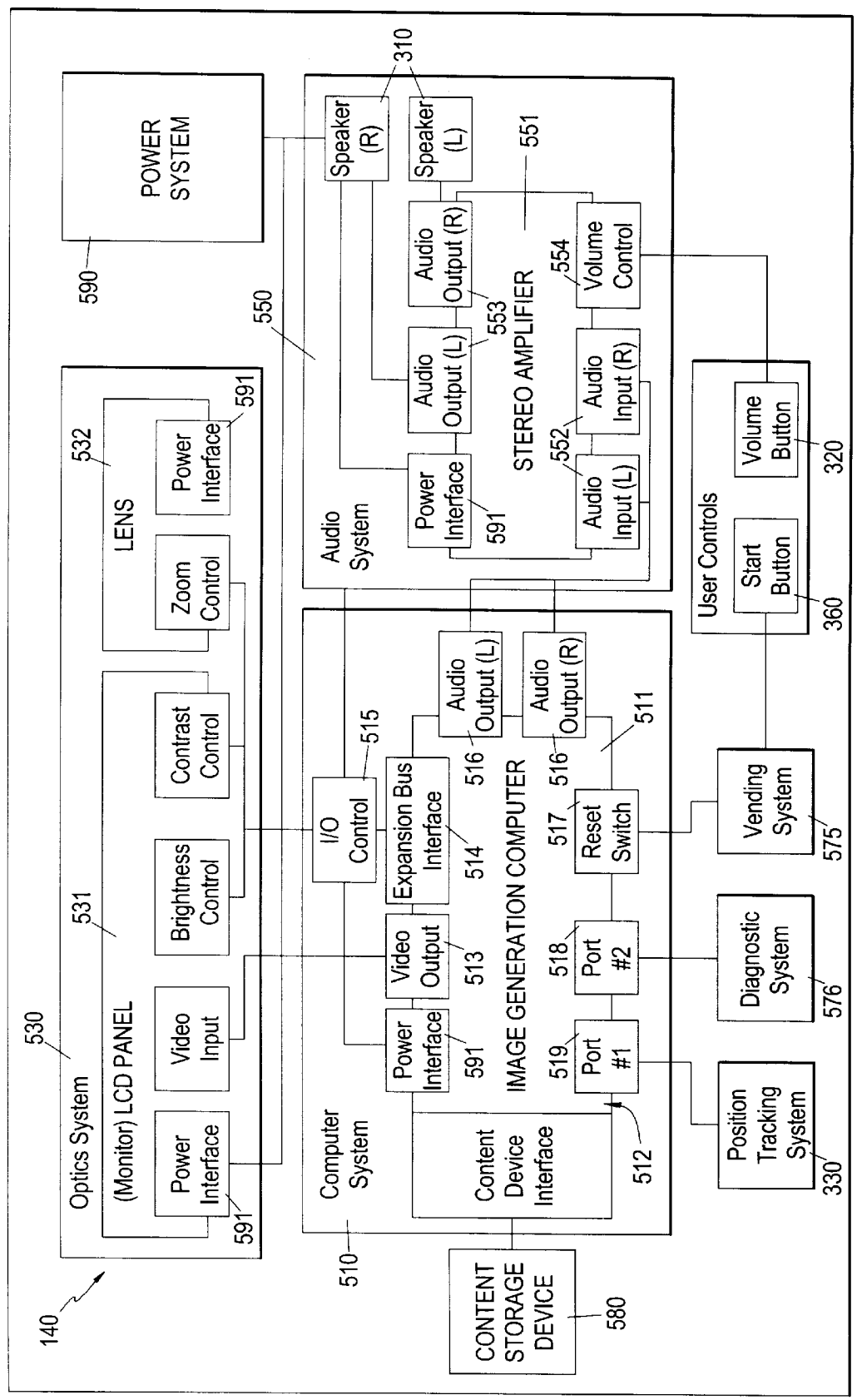
FIG. 5 is a functional block diagram of the processing system for an embodiment of the present invention.

Referring now to FIG. 5, a functional block diagram of the processing system 140 for an embodiment of the present invention will be described. The processing system 140 begins processing when a user presses the start button 360, which triggers an optional vending system 575. In most embodiments, the vending system 575 will be the mechanism for accepting coins, tokens, or other payment to initiate a viewing session using the viewing device 100. It should be understood that the vending system may take a number of different devices, such as credit cards, check cards, other magnetic strip cards, or any other form of payment. After a coin is inserted into the vending system 575 and the start button 360 is pressed, a signal is sent to the computer system 510. In response to the signal indicating that a coin has been inserted and the start button pressed, the computer system 510 will initiate presentation of content to the user. It should be understood by those skilled in the art that the computer system 510 may typically be integrated into the image head 110 or located at the platform base 400. If located at the platform base 400, the computer system 510 is housed with a protective cover, rests on the slab of the platform base 400, and interfaces with the image head 110 via electrical wiring running up the stand 130.

After a viewing sequence has been initiated, the computer system 510 polls the position tracking system 330, which is connected to an image generation computer 511 by a port #1 519, to determine the orientation of the viewing device 100. A diagnostic system 576 may be provided to ensure that each of the components of the processing system 140 is functioning properly.

After the orientation information has been determined, the image generation computer 511 polls a content storage device 580 to determine the viewing sequence that needs to be displayed to the user. The content storage device 580 may be an EPROM, an EPROM, a computer disk, an optical compact disk, or another mass storage medium. The content storage device 580 stores the information, such as computer-generated images, which will be overlaid on the natural view of the exhibit.

It should be understood that while the viewing sequences retrieved from the content storage device 580 are playing, the computer system 510 is receiving visual input from an optics system 530 via an I/O controller 515 and an expansion bus interface 514. The image generation computer 511 aligns and merges the viewing sequences, such as animation, retrieved from the content storage device 580 with the natural-view visual input received from a lens 532 of the optics system 530. The computer system 510 then outputs the merged visual image, via a video output 513, to a monitor 531. The user may optionally manually configure various display characteristics of the monitor 531, such as brightness or contrast, for maximum viewing enjoyment. Other embodiments of this invention will utilize digital image processing to determine these requirements and make automatic adjustments for them.

Simultaneously with the visual output, the computer system 510 may output synchronized audio signals, via audio outputs 516, to accompany and enhance the visual output. The audio signals may be stored in the content storage device 580. The audio system 550 receives the audio signals at audio inputs 552 of a stereo amplifier 551. The stereo amplifier 551 amplifies and outputs the audio signals to the speaker system 310 for the user's listening. The user may control the volume of the audio by actuating the optional volume button 320, which signals the volume control 554 of the audio system 550. The stereo amplifier 551 may be located in the image head 110 or integrated into the computer system located at the platform base 400.

A power system 590 provides power to each of the components of the processing system 140 via various power interfaces 591 at each component. The power system 590 may be either an AC power source and transformer or a DC power source, or combination of the two systems. A backup power source may also be implemented. In some embodiments, the system will retain the primary power supply at the base of the system or at some remote location, and only supply a low current electrical supply to the imaging head to ensure user safety.

Figure 6:
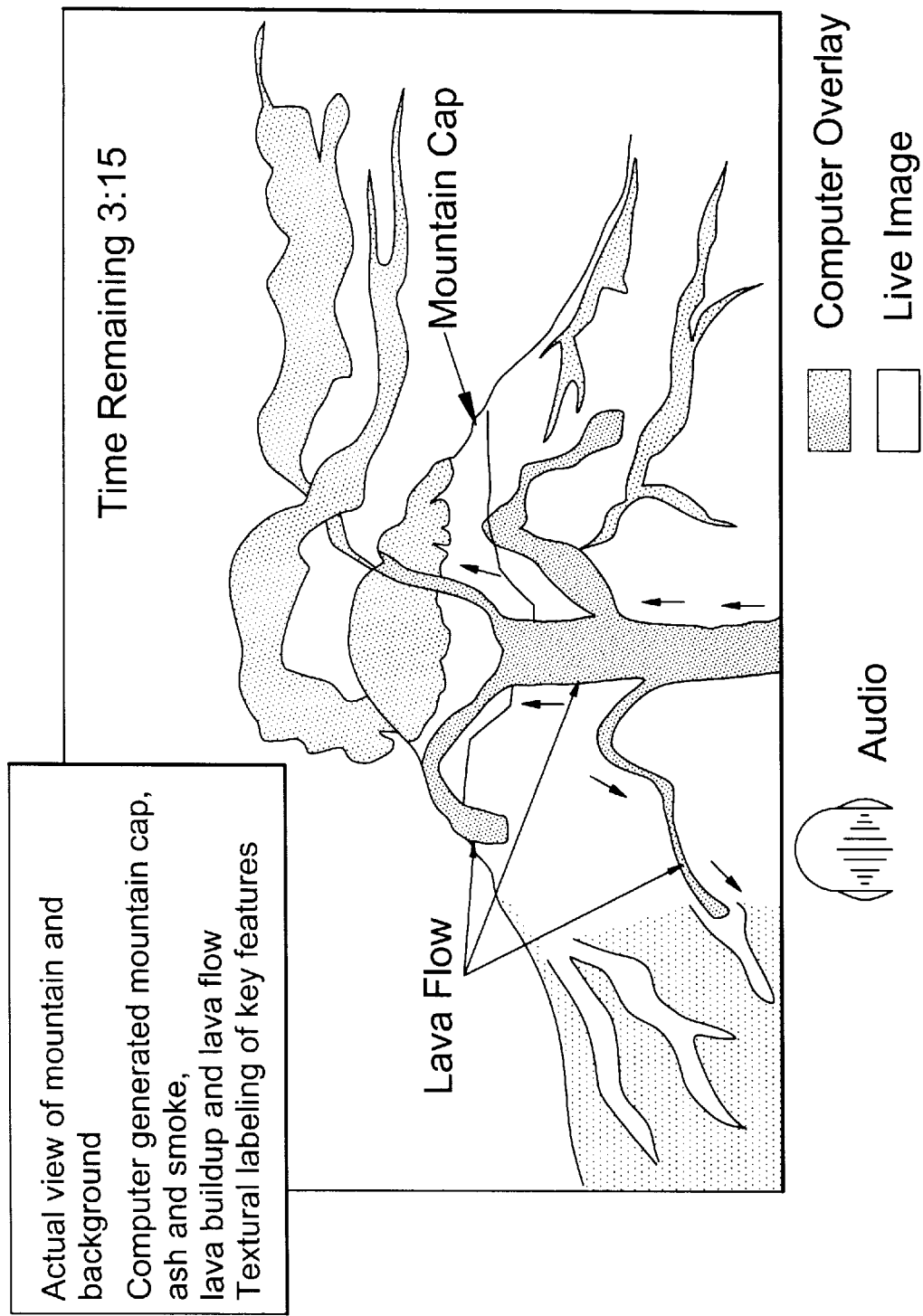
FIG. 6 is a conceptual illustration of a visual image presented to the user of an embodiment of the present invention.

Referring now to FIG. 6, a conceptual illustration of a visual image presented to the user of an embodiment of the present invention will be described. Embodiments of the present invention use unique processes to determine a user's interest and present a tailored presentation of the script while simultaneously controlling magnification levels, audio and animation effects, and synchronizing these effects with the user's free navigation of the viewing device 100. FIG. 6 depicts a representative exhibit, in this case a volcano, as seen through the viewing device 100 with informational details overlaid on the through-the-lens viewfinder imagery. As illustrated in FIG. 6, the device generates an overlay to make the volcano appear as it did prior to the eruption. The overlays are positioned and scaled accurately to provide a re-created view that is a mix of reality and computer-generated imagery. The overlays are time-sequenced and coupled with audio effects and narration to create an educational experience.

Figure 7:
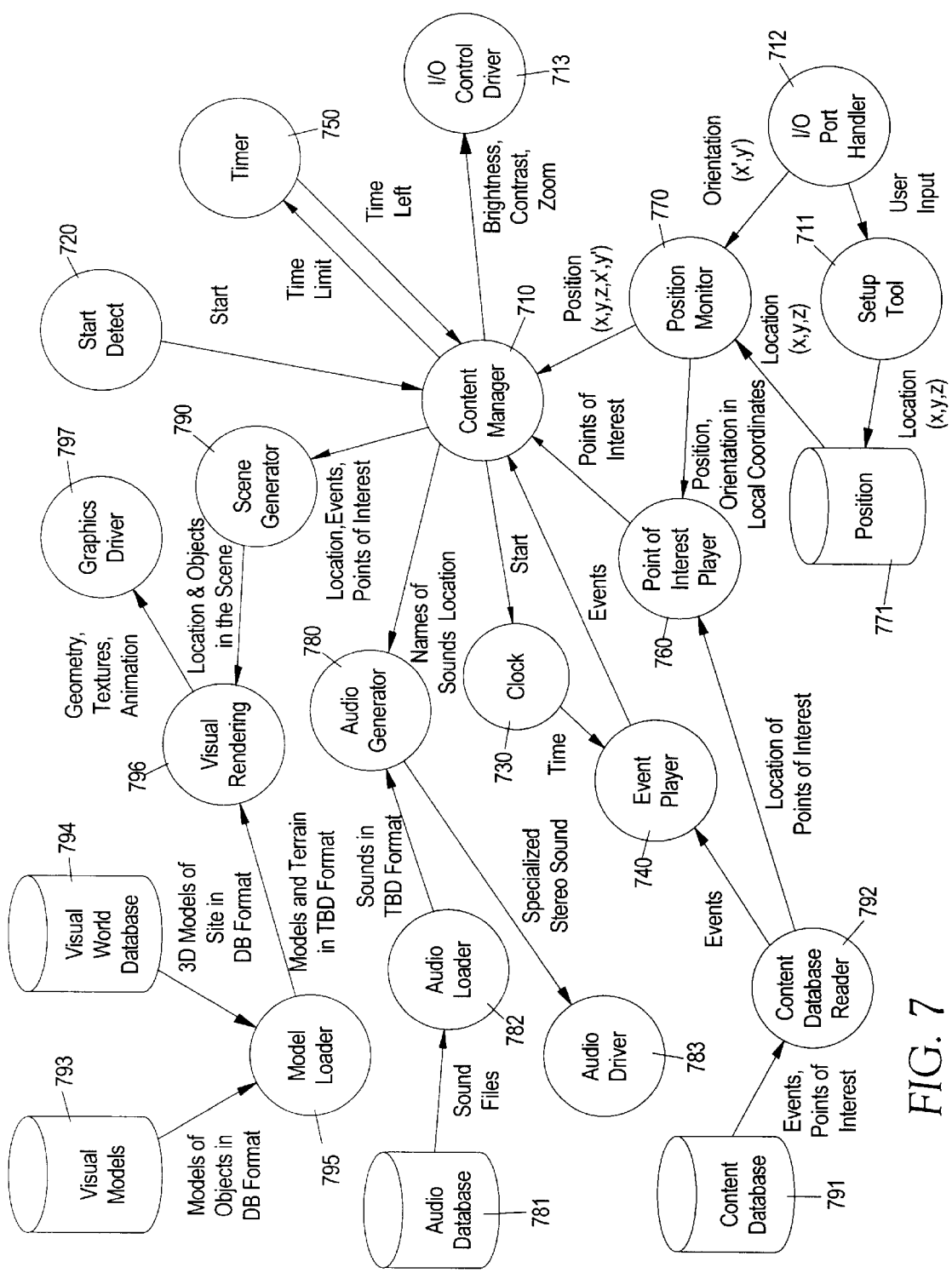
FIG. 7 is a data flow diagram illustrating the data flow of the viewing device.

Referring now to FIG. 7, a data flow diagram depicting the data flow of viewing device 100 is illustrated. The data flow may be implemented in software that runs within the processing system 140 of the viewing device 100. Additional procedures may operate on peripherals connected to the processing system 140. The bubbles within FIG. 7 represent software functions. The lines within FIG. 7 represent data flow. The arrows in FIG. 7 show the direction of the data flow. Each line is labeled with the data that is transferred. The cylinders in FIG. 7 represent databases used by the software.

The key software component of the viewing device 100 is the content manager 710. The content manager 710 is typically the primary decision maker for the viewing device 100. The content manager 710 receives input from other software functions and generates outputs to other functions. The content manager 710 initiates when it receives a start signal from the start detect 720 routine. The content manager 710 then sends a start signal to a clock 730 and loads a first event from an event player 740. Depending on the event loaded, the content manager 710 may set a time limit for a timer 750, load a point of interest from a points of interest player 760, or load the viewing device position from a position monitor 770. As the content manager 710 continues to process inputs from the event player 740, the point of interest player 760, and the position monitor 770, it generates data for an audio generator 780 and a scene generator 790.

The content manager 710 sends the current location, events, and points of interest to the scene generator 790. The content manager 710 sends the current location and sounds to the audio generator 780.

The unique content, such as computer-generated images, for different embodiments of the present invention is stored in a content database 791. The content database 791 comprises data representing all of the events and points of interest for the viewing device 100. A content database reader 792 extracts the content data from the content database 791 and sends the event data to the event player 740 and the data representing location of points of interest to the points of interest player 760. The event player 740 processes the events data based on the time it receives from the clock 730. The points of interest player 760 processes points of interest data based on the position and orientation it receives from the position monitor 770. Both the event player 740 and the points of interest player 760 transmit data to the content manager 710.

Visual models and virtual world models unique to each embodiment of the present invention are stored in a visual models database 793 and a virtual world database 794. The visual models and virtual world models are read by a model loader 795 using a database format. The model loader 795 converts the models in database format to an appropriate digital format and sends the model and terrain information to a visual rendering 796.

The scene generator 790 receives location, points of interest, and events from the content manager 710. Based on the events and location, the scene generator 790 determines what objects are in the scene. The objects and location are sent from the scene generator 790 to the visual rendering 796. Visual rendering 796 receives the objects and locations and selects the appropriate models and terrain. The models and terrain are converted to geometry, textures, and animations and sent to a graphics driver 797. The graphics driver 797 displays the geometry, textures, and animations to the user over the viewed image.

The sounds unique to each embodiment of the present invention are stored in sound files in an audio database 781. The sound files are read from the audio database 781 by an audio loader 782. The audio loader 782 sends the sound files in the appropriate digital format to the audio generator 780. The audio generator 780 receives the names of sounds and locations from the content manager 710. Using this information, the audio generator 780 creates sound signals, such as stereo, digital, specialized, and surround, that are sent to an audio driver 783. The audio driver 783 then plays the sounds for the user.

An I/O port handler 712 is also included in the viewing device 100. The I/O port handler 712 preferably has two modes, setup and run. In setup mode, the I/O port handler 712 sends user input to a setup tool 711. The setup tool 711 stores the location of the viewing device 100 in a position database 771. The position monitor 770 receives the location of the viewing device 100 from the position database 771. In run mode, the I/O port handler 712 sends the orientation of the viewing device 100 to the position monitor 770. The position monitor 770 sends the position to the content manager 710 and the position and orientation to the points of interest player 760.

The timer 750 receives a time limit from the content manager 710 and sends the time left to the content manager 710. The content manager 710 sends commands for peripherals connected to the invention to an I/O controller driver 713. These commands may include brightness, contrast, and zoom.

Figure 8:
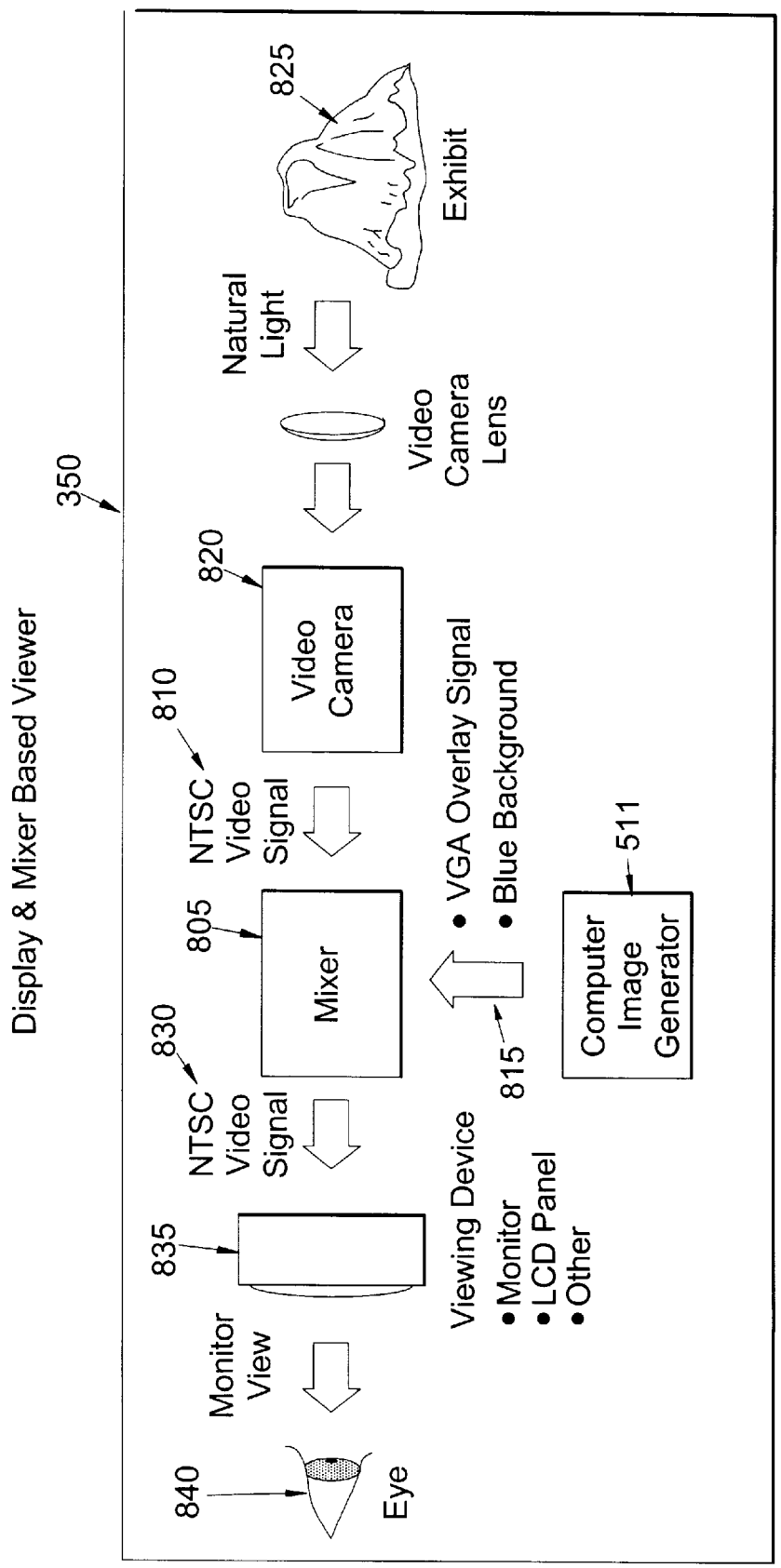
FIG. 8 is an illustration of an optical unit incorporating a chroma-key mixer and video monitor combination in accordance with an embodiment of the present invention.
Figure 9:
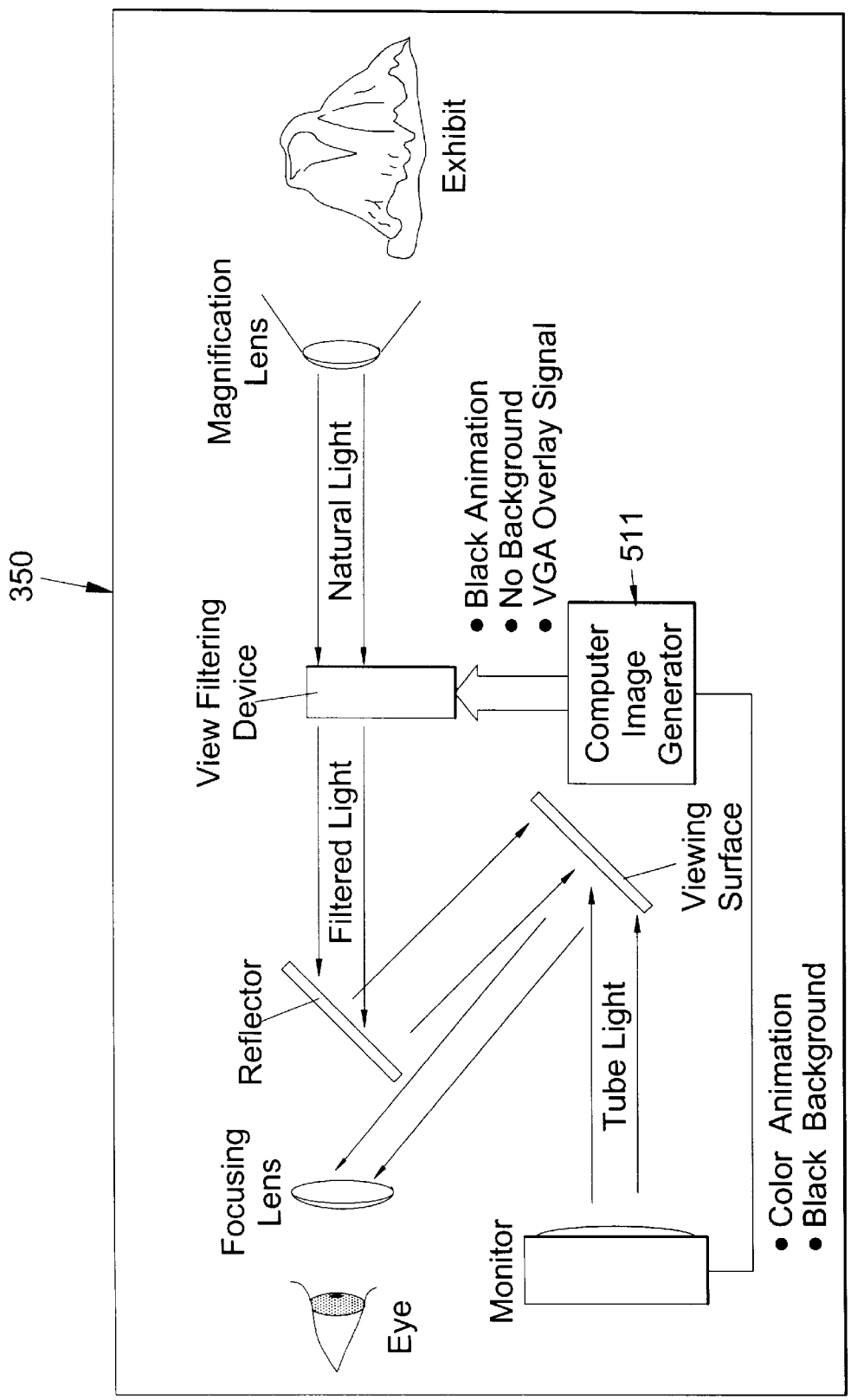
FIG. 9 is an illustration of an optical unit incorporating a mirror-based viewer with a simple beam splitter filter in accordance with an embodiment of the present invention.
Figure 10:
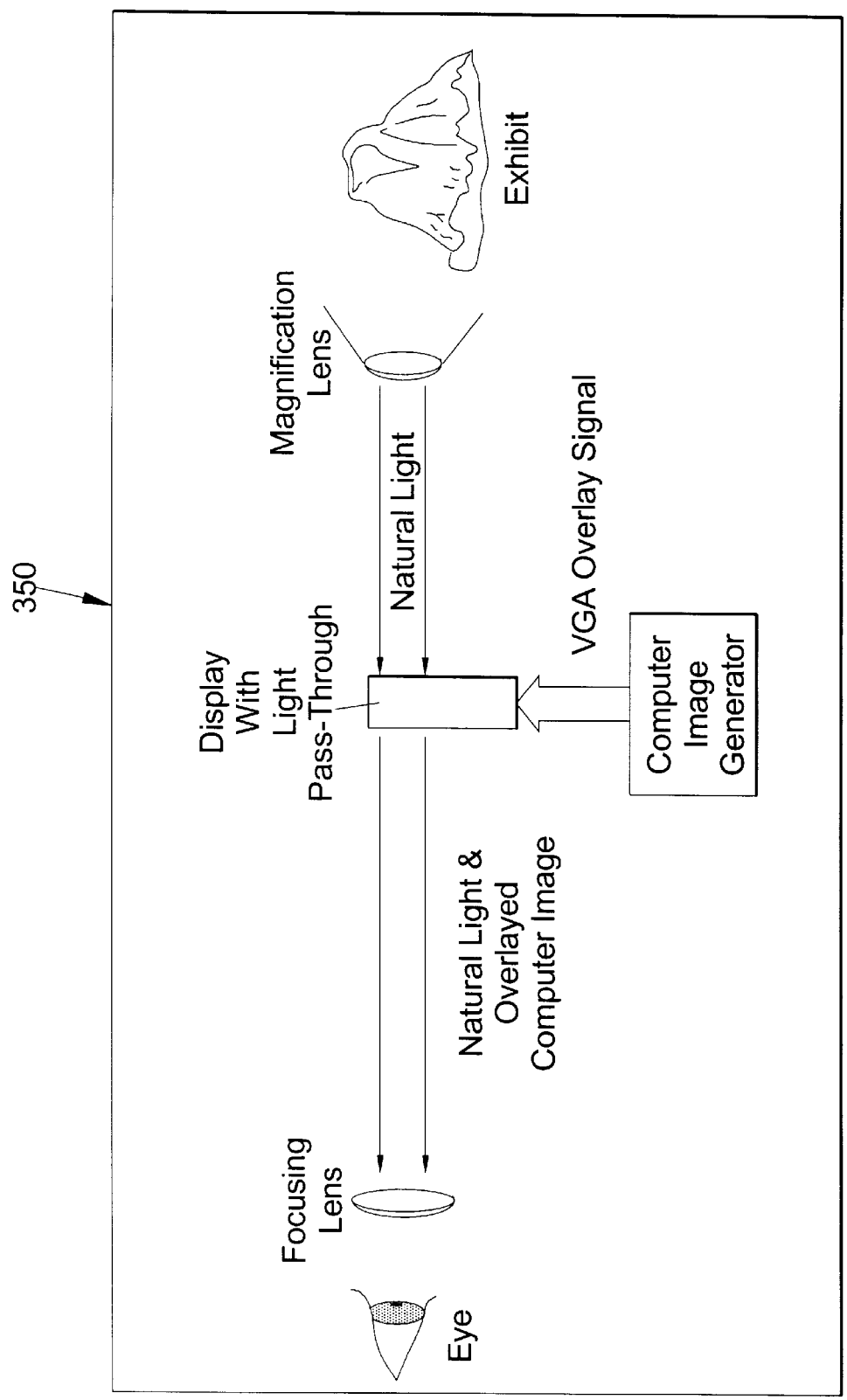
FIG. 10 is an illustration of an optical unit incorporating a LCD filter-based viewer in accordance with an embodiment of the present invention.

Turning now to FIGS. 8–10, it should be understood that the optical unit 350 for the viewing device 100 may have several different options in order to support multiple price and performance requirements of purchasers.

Referring now to FIG. 8, an illustration of an optical unit 350 in accordance with an embodiment of the present invention will be described. The optical unit 350 may comprise a display and mixer based viewer driven by a mixer 805 that integrates computer generated images and camera generated video. The mixer 805 may typically be a Chroma-key mixer or a computer digital mixer. The mixer 805 receives a National Television Standards Committee (NTSC) video signal 810 from a video camera 820 directed at an exhibit site 825. The mixer 805 also receives a VGA overlay signal 815 from the image generation computer 511. The mixer 805 mixes the NTSC video signal 810 with the VGA overlay signal 815 and outputs an output NTSC video signal 830 to a monitor 835 so that it may be viewed by a viewer 840. In the mixing process, all of the VGA data is displayed instead of the NTSC data, except where the VGA data is "blue background". The VGA background imagery is not overlaid on the NTSC data, thus creating an augmented image.

Referring now to FIG. 9, another illustration of an optical unit 350 in accordance with an embodiment of the present invention will be described. The optical unit 350 may comprise a mirror-based viewer, as shown in FIG. 9. The optical unit 350 may integrate a display of computer graphics and natural light sources. The optical unit may optionally be integrated with a view filtering device to filter the natural light images and reflect the two sources onto a single viewing surface. The view filtering device, such as a LCD panel or beam splitter, can receive signals from the computer image generator to display "black" blocks for features of the live exhibit that need to be removed. The computer image generator sends imagery to the monitor for each of these blocks that, when reflected, provide a replacement image.

Referring now to FIG. 10, another illustration of an optical unit 350 in accordance with an embodiment of the present invention will be described. The optical unit 350 may comprise a display based viewer that allows light to pass through it, as shown in FIG. 10, and that integrates computer generated images with natural light images directly at a display. The computer image generator sends VGA data to the display for only the pixels that represent the positions of overlay data. Because the display has no back light, it allows the complete live image to pass through to the viewer's eye, along with those pixels lit by the VGA signal.

Figure 11:
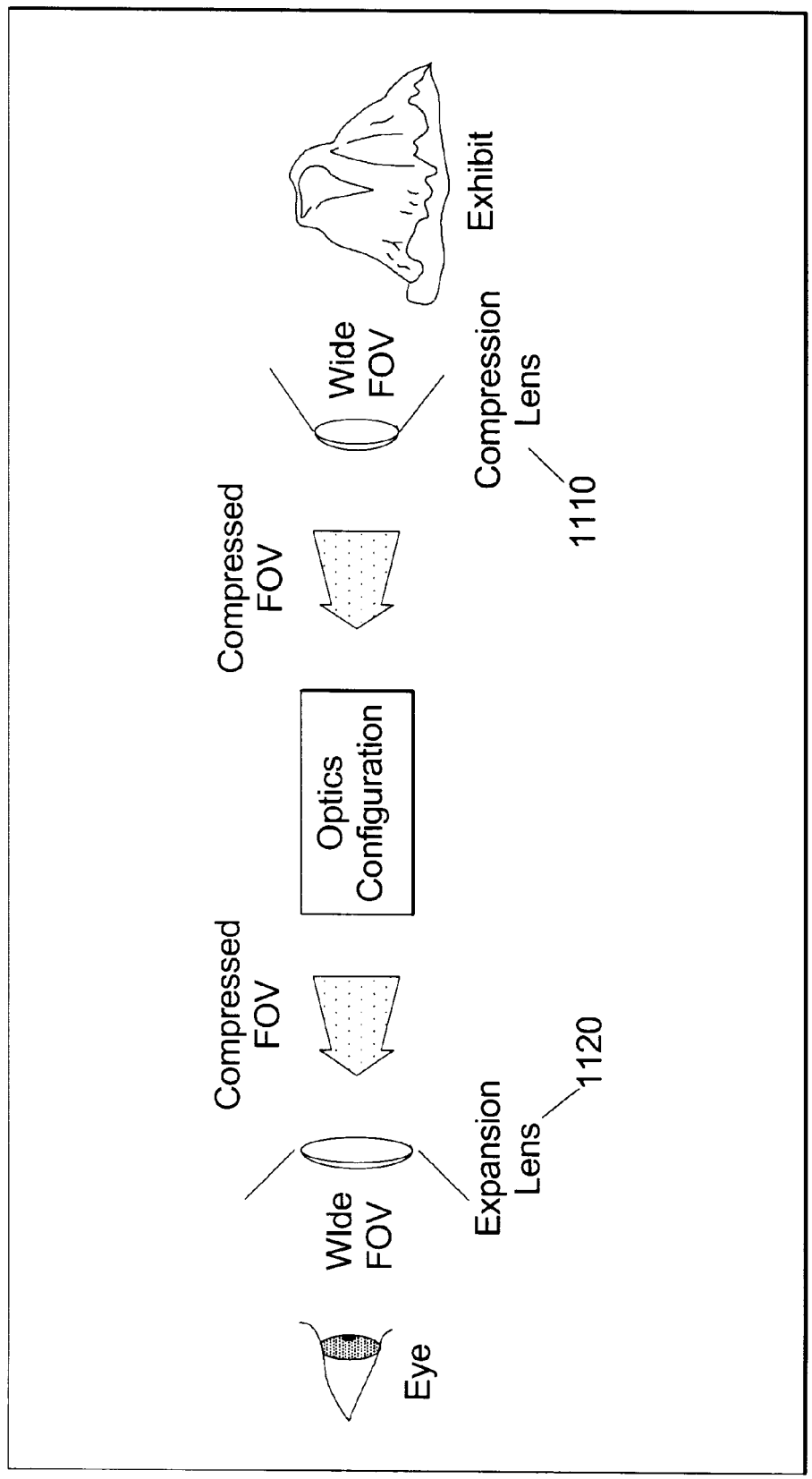
FIG. 11 is an illustration of an optical unit of an embodiment of the present invention incorporating field-of-view expansion technology.
Figure 12:
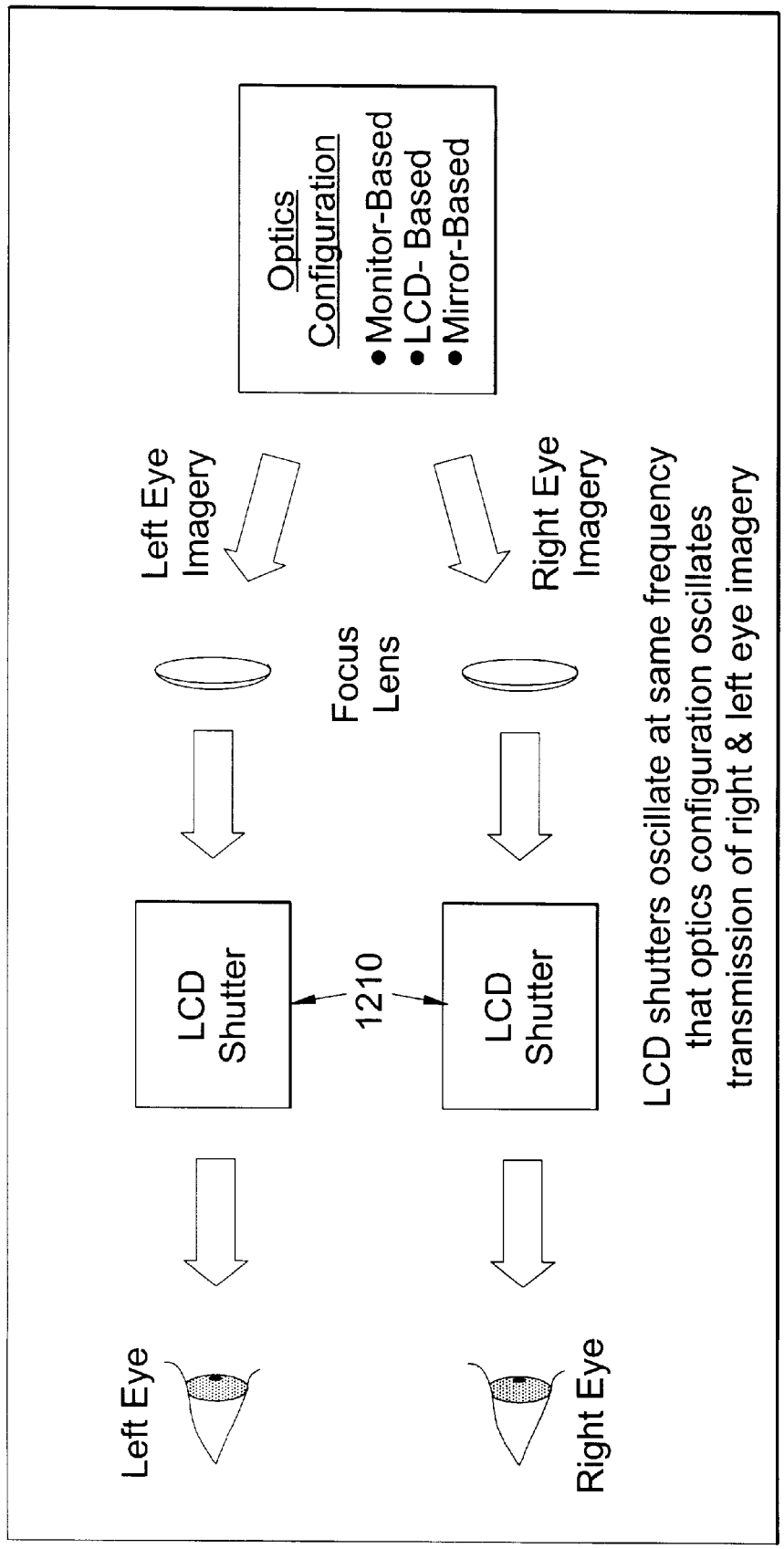
FIG. 12 is an illustration of an optical unit of an embodiment of the present invention incorporating optical stereo technology.

Each of the optical unit configurations can optionally be integrated with FOV (Field of View) expansions, as shown in FIG. 11, or optical stereo devices, as shown in FIG. 12.

As shown in FIG. 11, the FOV expansion system comprises FOV Compression Lenses 1110 stationed in front of each image source and FOV expansion lenses 1120 stationed in front of each eye port. The camera lens 1110 generates a wide-angle view of the exhibit and compresses it for optimal processing by the optics system. The image generation system provides overlay data with the same compression factors as the compression lens. Once the optic system generates the integrated view of live and computer images, the compressed data is displayed and then viewed through an expansion lens that makes the small and compressed display image appear as large as it was prior to compression. This maintains the magnitude scale for the viewer which is critical for creating the effect of viewing the overlaid exhibit to scale.

Referring now to FIG. 12, the optical stereo devices comprise simple LCD shutter 1210 systems that are placed in front of each eye port to control the presentation of right-and-left eye images generated from the computer animation device. In FIG. 12, a shutter system is used to create a 3-D effect. The optics system presents a right eye and left eye view that oscillate at over 30 Hz on the display. Lenses focus the display view to two shutters. The shutters oscillate at the same intervals and frequencies as the optics display to allow the right and left eyes to see the eye's perspective view, but not to see the other eye's perspective view. This same effect can be embodied in the device by using a separate monitor for each eye instead of lenses and shutters.

Figure 13:
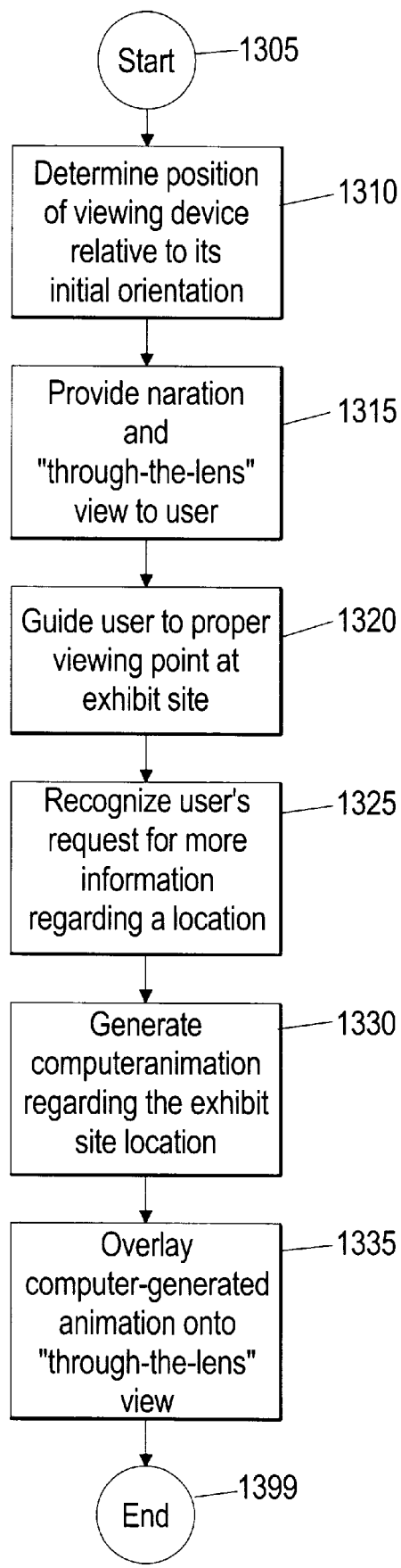
FIG. 13 is a flowchart illustrating a method for overlaying computer-generated images over a viewed image in accordance with an embodiment of the present invention.

Referring now to FIG. 13, a flowchart illustrating a method 1300 for overlaying computer-generated images over a viewed image in accordance with an embodiment of the present invention will be described. The method 1300 begins at start step 1305 and proceeds to step 1310. Preferably, the method proceeds to step 1310 when a user inserts a coin or token into a viewing device to begin the method 1300. It should be understood that other methods of payment known to those skilled in the art may be alternatively used.

At step 1310, the viewing device is initialized by determining the position of the viewing device relative to its initial orientation. After determining the position of the viewing device relative to its initial orientation, the method 1300 proceeds to step 1315.

At step 1315, a natural "through-the-lens" view of the exhibit site is provided to the user along with narration coinciding with the location that the user is viewing. The method then proceeds to step 1320.

At step 1320, information is provided to the user to guide the user to the proper viewing location at the exhibit site. For example, arrows may be provided on the viewing screen to direct the user to move the viewing device up, down, left or right depending on the viewing location that is to be described next in the narration. The method then proceeds to step 1325.

At step 1325, the viewing device recognizes the user's request for additional information regarding a location at the exhibit site. The user may activate a request for additional information by positioning the viewing device's center on the area of interest, and pushing a button on the image head. The method then proceeds to step 1330.

At step 1330, the viewing device generates a computer-generated animation related to the location at the exhibit site that the user is viewing through the viewing device and the method 1300 proceeds to step 1335.

It should be understood that if the image head is moved after the overlaying has started, the following steps may occur. First, the movement of the image head in the azimuth and elevation direction is determined. Second, the new location of the image head is determined. Third, overlays for the imagery related to the new viewing location are created. Finally, the new computer-generated overlays are displayed over the live image.

At step 1335, the computer-generated animation is overlaid onto the actual through-the-lens image viewed by the user. The method then ends at step 1399 when the timer expires and the viewing device shuts off.

From the foregoing description, it will be apparent to those skilled in the art that the present invention provides a method and apparatus for overlaying computer-generated animation onto an image viewed through a magnifying viewing device.

It should be understood that the viewing device 100 may have several different embodiments. For example, the power supply of the viewing device 100 may be either AC or DC compatible, as well as capable of supporting solar power generators. As another example, the casing for the image head 110 may be constructed from either metal or plastic, depending upon the environmental conditions expected to be encountered by the viewing device 100. As still another example, the image head 110, head mount 120, stand 130, and processing system 140 may be manufactured to be capable of withstanding severe environmental conditions to enable outdoor use.

Additionally, it should be understood that the viewing device 100 may be constructed in stationary or single degree-of-freedom configurations. These configurations would eliminate the head mount 120 (the image head 110 will mount directly on the stand 130), the position tracking system 330, and the bearings 240 in the stand 130. It should be further understood that the present invention may be configured without the audio option.

Other uses can also be made of the viewing device 100. For instance, informational overlays can be generated to inform the user of how a volcano erupts, or how the Grand Canyon was formed. Other uses include labeling landmarks from overlooks, interactive gaming, construction and renovation planning, educational aids for product exhibits, numerous re-enactments, proposal of theories, and others. The uses of the present invention are virtually unlimited.

It will further be apparent to those skilled in the art that the present invention provides a method and apparatus for overlaying computer-generated animation onto an image viewed through a magnifying viewing device that is more cost-effective than human re-enactments and has greater availability to users, which would alleviate many congestion problems associated with human re-enactments.

It should still be further apparent that the present invention includes unique processing capabilities including the integration of navigational and inquiry processes to enable users to receive guided tours through an embedded overlay device.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention. While the invention has been described with reference to details of the illustrated embodiments, these details are not intended to limit the scope of the present invention as particularly pointed out and distinctly claimed below.

What is claimed is:

1. An exhibit viewing device comprising:
   an image head for housing an integrated electronics system, wherein the integrated electronics system is reconfigurable for the dynamic and correlated generation and overlay of visual effects onto a natural light source exhibit viewed through the exhibit viewing device; and
   a head mount for user-controlled navigation of the image head.

2. The exhibit viewing device of claim 1 wherein the integrated electronic system is further operative to generate audio signals and wherein the image head further comprises a speaker system for broadcasting the audio signals.

3. The exhibit viewing device of claim 1 further comprising a position tracking system for determining the viewing elevation and viewing azimuth of the exhibit viewing device so that the visual effects may be coordinated, generated and overlaid onto the proper natural light source exhibit viewed through the exhibit viewing device.

4. The exhibit viewing device of claim 3 wherein the position tracking system is an electromagnetic measurement device.

5. The exhibit viewing device of claim 3 wherein the position tracking system comprises shaft encoders.

6. The exhibit viewing device of claim 1 wherein the integrated electronics system comprises an optical unit for overlaying the visual effects onto the natural light source exhibit.

7. The exhibit viewing device of claim 1 wherein the image head further comprises a viewer through which the user views the natural light source exhibit and overlaid visual effects.

8. The exhibit viewing device of claim 1 wherein the device is weatherized for outdoor use to enable outdoor exhibits to be overlaid.

9. The exhibit viewing device of claim 1 wherein the image head is secured from an overhead structure.

10. The exhibit viewing device of claim 1 wherein the image head is received in a weatherized kiosk frame, similar to ATM machines.

11. The exhibit viewing device of claim 1 further comprising a stand connected to the head mount for stability of the exhibit viewing device and user access to the exhibit viewing device.

12. The exhibit viewing device of claim 1 further comprising a booth, wherein the booth encloses the image head and the head mount.

13. The exhibit viewing device of claim 1, wherein the electronic system is connected via a network to electronic systems in other similar viewing devices in order to exchange visual effects among the viewing devices.

14. The viewing system as recited in claim 1, wherein said integrated electronics system includes means for recognizing live, viewed objects contained within said exhibit and locking said over-laid visual effects onto selected said viewed objects such that movement of said image head does not alter the position of said over-laid visual effects with respect to said viewed objects.

15. For an electronic system for viewing an exhibit site incorporated into a viewing device, a method for overlaying a computer-generated image onto a viewed image of the exhibit site, comprising the steps of:
   determining a horizontal and vertical position of the viewing device;
   generating computer animation regarding the particular location of the exhibit site; and
   overlaying the computer animation onto a lens view of the viewing device.

16. The method recited in claim 15 further comprising the step of determining whether a token has been inserted into the viewing device before determining the position of the viewing device.

17. The method recited in claim 15 further comprising the step of providing audio effects and the lens view to the user before guiding the user to move the viewing device.

18. The method recited in claim 15 further comprising the step of guiding a user of the viewing device to move the viewing device to a particular location of the exhibit site.

19. The method recited in claim 18 wherein the step of guiding the user of the viewing device to move the viewing device to a particular location of the exhibit site comprises displaying arrows on the lens view of the viewing device, wherein the arrows correspond to the direction which the user should move the viewing device to reach the particular location.

20. The method recited in claim 15 further comprising the step of recognizing a user's request for more information regarding the particular location before generating computer animation regarding the particular location of the exhibit site.

21. The method recited in claim 15 wherein the step of determining a position of the viewing device comprises determining the direction the viewing device is positioned relative to an initial orientation of the viewing device.

22. A computer-readable medium having computer-executable instructions for performing the steps recited in claim 15.

23. The method recited in claim 15 further comprising the step of determining what the viewer is looking at and automatically adjusting a camera focus setting and the computer's presentation of scaled information overlays to allow support for multiple exhibits of varying distances from the device.

24. The method recited in claim 15, wherein the method is an intuitive interaction augmented reality method, wherein users may easily navigate the unit, receive overlaid information, or request additional data without special instructions, fitting, or training.

25. The method of claim 15, wherein the step of generating computer animation further includes exchanging computer animation via a network with other electronic systems in other similar viewing devices.

26. A virtual-reality panoramic viewing device comprising:
an image head for housing at least one monitor, said image head capable of movement in a pan direction and a tilt direction;
at least one sensor for monitoring movement of the image head in the pan direction and tilt direction and generating pan direction data and tilt direction data; and
a computer for receiving the pan direction data and the tilt direction data and generating image data for transmittal to and display on the monitor.

27. The viewing device of claim 26 further comprising a head mount for user-controlled movement of the image head.

28. The viewing device of claim 26 wherein the at least one monitor is a pair of miniature cathode ray tubes (CRTs).

29. The viewing device of claim 28 further comprising an eyepiece in association with each of the miniature cathode ray tubes for viewing the image data on the miniature cathode ray tubes.

30. The viewing device of claim 26 wherein the computer is further capable of generating sound data for transmittal to and output via at least one speaker in the monitor.

31. The viewing device of claim 26, wherein the computer is connected via a network to computers in other similar viewing devices in order to exchange image data among the viewing devices.

32. The viewing device as recited in claim 26, wherein said image data generated by said computer includes image data for recreating an exhibit located in front of said viewing device and said computer includes means for recognizing live, viewed objects contained within said exhibit and locking over-laid visual effects onto selected said viewed objects such that movement of said image head does not alter the position of said over-laid visual effects with respect to said viewed objects.

33. The viewing device as recited in claim 26, wherein said computer includes means for acquiring live, viewed visual data from an exhibit located in front of said viewing device and means for recognizing selected objects contained within said exhibit.

34. A virtual-reality panoramic viewing system comprising:
an input subsystem for generating viewing direction data based on the directional view of a rotating head of the viewing system;
a control subsystem for receiving the viewing direction data and generating image data and sound data for transmittal to the output subsystem based on the viewing direction data; and
an output subsystem comprising at least one eyepiece and at least one electronic display screen for displaying the image data, and further comprising at least one speaker for broadcasting the sound data.

35. The viewing system of claim 34 wherein the input subsystem further comprises a control for zooming the image data.

36. The viewing system of claim 34, wherein neither the control subsystem nor the output subsystem are located in a single housing.

37. The viewing system of claim 34, wherein the control subsystem comprises a personal computer in electronic communication with said output subsystem.

38. The viewing system of claim 34, wherein the control subsystem is connected via a network to control subsystems in other similar viewing systems in order to exchange image data and sound data among the viewing systems.

39. The viewing system as recited in claim 34, wherein the control subsystem includes a position monitor, a position database operatively connected to the position monitor for identifying a selected viewing location from the viewing direction data, and a point of interest player for passing points of interest to a content manager.

40. The viewing system as recited in claim 34, wherein the image data generated by said control subsystem includes image data for recreating an exhibit located in front of said viewing system and wherein said control subsystem further includes means for recognizing live, viewed objects contained within said exhibit and locking over-laid visual effects onto selected said viewed objects such that movement of said output subsystem does not alter the position of said over-laid visual effects with respect to said viewed objects.

41. The viewing system as recited in claim 34, wherein said output subsystem includes means for acquiring live, viewed visual data contained within an exhibit located in front of said viewing system and said control subsystem includes means for recognizing selected objects contained within said exhibit.

42. A virtual-reality panoramic viewing system comprising:
means for displaying image data to a user of said viewing system, said displaying means including at least one eyepiece and an electronic display screen for converting stored and processed data into visual images;
means for housing said displaying means in an appropriate position to accommodate said user;
means for sensing and generating viewing direction data based upon the pan and tilt movements of said housing means;
means for receiving said viewing direction data and generating image data to said displaying means in response to said direction data.

43. The viewing system as recited in claim 42, wherein said image data includes pre-recorded image data representative of or associated with a live image, and wherein said image data is correlated to be over-laid onto said live image to alter a visual representation of said live image.

44. The viewing system of claim 42, wherein the means for generating image data is connected via a network to means for generating image data in other similar viewing systems in order to exchange image data among the viewing systems.

45. The viewing system as recited in claim 42, wherein said electronic display screen comprises a liquid crystal display and said displaying means includes means for passing image data to said liquid crystal display comprising a live exhibit image positioned in front of said housing means.

46. The viewing system as recited in claim 45, wherein said means for generating image data includes means for associating coordinate information with said viewing direction data and means for correlating said coordinate information with stored content for correlated overlay of images on data viewed by said displaying means.

47. The viewing system as recited in claim 42, wherein said means for generating image data includes means for associating coordinate information with said viewing direction data and means for correlating said coordinate information with stored content for correlated overlay of images on data viewed by said displaying means.

* * * * *